US010894364B2

(12) United States Patent
Spears (10) Patent No.: US 10,894,364 B2
(45) Date of Patent: Jan. 19, 2021

(54) METHOD FOR MELT POOL MONITORING USING GEOMETRIC LENGTH

(71) Applicant: General Electric Company, Schenectady, NY (US)

(72) Inventor: Thomas Graham Spears, Springdale, OH (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 16/219,531

(22) Filed: Dec. 13, 2018

(65) Prior Publication Data

US 2020/0189197 A1 Jun. 18, 2020

(51) Int. Cl.
| | | |
|---|---|---|
| B29C 64/393 | (2017.01) | |
| G06T 7/62 | (2017.01) | |
| G06T 7/73 | (2017.01) | |
| B29C 64/153 | (2017.01) | |
| G06T 7/00 | (2017.01) | |
| G06T 7/40 | (2017.01) | |
| B33Y 10/00 | (2015.01) | |
| B33Y 50/02 | (2015.01) | |

(52) U.S. Cl.
CPC .......... *B29C 64/393* (2017.08); *B29C 64/153* (2017.08); *G06T 7/001* (2013.01); *G06T 7/40* (2013.01); *G06T 7/62* (2017.01); *G06T 7/74* (2017.01); *B33Y 10/00* (2014.12); *B33Y 50/02* (2014.12); *G06T 2207/30144* (2013.01)

(58) Field of Classification Search
CPC ....... B29C 64/393; B29C 64/153; G06T 7/62; G06T 7/001; G06T 7/74; G06T 7/40; G06T 2207/30144; B33Y 50/02; B33Y 10/00
See application file for complete search history.

(56) References Cited

U.S. PATENT DOCUMENTS

| 6,046,426 A | 4/2000 | Jeantette et al. |
|---|---|---|
| 6,459,951 B1 | 10/2002 | Griffith et al. |
| 6,925,346 B1 | 8/2005 | Mazumder et al. |
| 6,940,037 B1 | 9/2005 | Kovacevic et al. |

(Continued)

OTHER PUBLICATIONS

Chen et al., "Image Processing Methods Based on Key Temperature Features for State Analysis and Process Monitoring of Selective Laser Melting (SLM)", ISMSI '18: Proceedings of the 2nd International Conference on Intelligent Systems, Metaheuristics & Swarm Intelligence, Mar. 2018, pp. 110-115 (Year: 2018).*
European Extended Search Report for EP Application No. 19214160.4 dated Feb. 28, 2020 (8 pages).

(Continued)

*Primary Examiner* — Thomas C Lee
*Assistant Examiner* — Michael Tang
(74) *Attorney, Agent, or Firm* — Dinsmore & Shohl LLP (57) ABSTRACT

A method of controlling an additive manufacturing process in which a directed energy source is used to selectively melt material to form a workpiece, forming a melt pool in the process of melting, the method comprising: using an imaging apparatus to generate an image of the melt pool comprising an array of individual image elements, the image including a measurement of at least one physical property for each of the individual image elements; from the measurements, mapping a melt pool boundary of the melt pool; computing a geometric length of the melt pool boundary; and controlling at least one aspect of the additive manufacturing process with reference to the geometric length.

15 Claims, 6 Drawing Sheets

(56) References Cited

U.S. PATENT DOCUMENTS

| | | | |
|---|---|---|---|
| 6,995,334 B1 | 2/2006 | Kovacevic et al. | |
| 7,043,330 B2 | 5/2006 | Toyserkani et al. | |
| 8,456,523 B2 | 6/2013 | Stork Genannt Wersborg | |
| 9,056,368 B2 | 6/2015 | Stork Genannt Wersborg | |
| 9,105,077 B2 | 8/2015 | Wersborg et al. | |
| 9,355,441 B2 | 5/2016 | Wersborg et al. | |
| 9,492,886 B2 | 11/2016 | Stork Genannt Wersborg | |
| 9,662,744 B2 | 5/2017 | Chida et al. | |
| 9,696,142 B2 | 7/2017 | Bamberg et al. | |
| 9,821,410 B2 | 11/2017 | Zollinger et al. | |
| 9,933,255 B2 | 4/2018 | Beuth, Jr. | |
| 9,939,394 B2 | 4/2018 | Beuth, Jr. et al. | |
| 9,977,425 B1 | 5/2018 | McCann et al. | |
| 9,981,341 B2 | 5/2018 | Mazumder et al. | |
| 2005/0121112 A1 | 6/2005 | Mazumder et al. | |
| 2008/0314878 A1 | 12/2008 | Cai et al. | |
| 2011/0085735 A1* | 4/2011 | Malik | G06K 9/48 382/199 |
| 2013/0142421 A1* | 6/2013 | Silver | G06K 9/6204 382/159 |
| 2014/0163717 A1* | 6/2014 | Das | C30B 19/10 700/119 |
| 2016/0016259 A1 | 1/2016 | Bruck et al. | |
| 2016/0033434 A1* | 2/2016 | Beuth | B33Y 40/00 702/136 |
| 2016/0179064 A1 | 6/2016 | Arthur et al. | |
| 2017/0000784 A1 | 1/2017 | Samee et al. | |
| 2017/0014953 A1 | 1/2017 | Uchinda et al. | |
| 2017/0087634 A1* | 3/2017 | Beacham, Jr. | B22F 3/1055 |
| 2017/0120337 A1 | 5/2017 | Kanko et al. | |
| 2017/0120376 A1 | 5/2017 | Cheverton et al. | |
| 2017/0189960 A1 | 7/2017 | Ibe | |
| 2017/0239719 A1* | 8/2017 | Buller | B23K 26/032 |
| 2017/0239752 A1 | 8/2017 | Buller et al. | |
| 2017/0246810 A1* | 8/2017 | Gold | B33Y 50/02 |
| 2017/0266883 A1* | 9/2017 | Yuji | B33Y 10/00 |
| 2017/0320168 A1 | 11/2017 | Martinsen | |
| 2017/0364058 A1 | 12/2017 | Jagdale et al. | |
| 2018/0001563 A1 | 1/2018 | Frohnmaier et al. | |
| 2018/0133840 A1 | 5/2018 | Noriyama et al. | |
| 2018/0136633 A1 | 5/2018 | Small et al. | |
| 2018/0154484 A1 | 6/2018 | Hall | |
| 2018/0178287 A1 | 6/2018 | Mamrak et al. | |
| 2018/0186078 A1 | 7/2018 | Herzog et al. | |
| 2018/0193954 A1 | 7/2018 | Yuan et al. | |
| 2018/0311901 A1* | 11/2018 | Chang | B33Y 10/00 |
| 2019/0171176 A1* | 6/2019 | Ma | B23Q 17/22 |
| 2019/0275585 A1* | 9/2019 | Akram | G06F 30/23 |

OTHER PUBLICATIONS

Chen Zhehan et al., "Image Processing Methods Based on Key Temperature Features for State Analysis and Process Monitoring of Selective Laser Melting (SLM)", Intelligent Systems, Metaheuristics & Swarm Intelliggence, ACM, 2 Penn Plaza, Suite 701 New York, NY 10121-0701, Mar. 24, 2018, pp. 110-115.

Song, Lijun et al., "Phase congruency melt pool edge extraction for laser additive manufacturing", Journal of Materials Processing Technology, Elsevier, NL, vol. 250, Jul. 10, 2017, pp. 261-269.

Craeghs, Tom et al., "Feedback control of Layerwise Laser Melting using optical sensors", Physics Procedia, Amsterdam, NL, vol. 5, Jan. 1, 2010, pp. 505-514.

Kriczky, Dennis A. et al., "3D spatial reconstruction of thermal characteristics in directed energy deposition through optical thermal imaging", Journal of Materials Processing Technology, Elsevier, NL, vol. 221, Feb. 21, 2015, pp. 172-186.

* cited by examiner

METHOD FOR MELT POOL MONITORING USING GEOMETRIC LENGTH

BACKGROUND OF THE INVENTION

This invention relates generally to additive manufacturing and related processes, and more particularly to apparatus and methods for melt pool monitoring and process control in additive manufacturing.

Additive manufacturing is a process in which material is built up layer-by-layer to form a component. Additive manufacturing is limited primarily by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing". Such terms are treated as synonyms for purposes of the present invention.

One type of additive manufacturing machine is referred to as a "powder bed" machine and includes a build chamber that encloses a mass of powder which is selectively fused by a laser to form a workpiece.

One problem with prior art additive manufacturing machines is that they operate in an open loop environment and cannot report back to an operator the stability of the process being applied. The systems in place to determine health of the process occur in quality steps after the build has finished. When issues are caught there can be work in progress that is scrapped due to machine issues that were undetected till the ex post facto quality system could catch them.

BRIEF DESCRIPTION OF THE INVENTION

This problem is addressed by a method of imaging a melt pool during a manufacturing process and extracting a geometric length of the melt pool.

According to one aspect of the technology described herein, a method of controlling an additive manufacturing process is provided in which a directed energy source is used to selectively melt material to form a workpiece, forming a melt pool in the process of melting. The method includes: using an imaging apparatus to generate an image of the melt pool comprising an array of individual image elements, the image including a measurement of at least one physical property for each of the individual image elements; from the measurements, mapping a melt pool boundary of the melt pool; computing a geometric length of the melt pool boundary; and controlling at least one aspect of the additive manufacturing process with reference to the geometric length.

According to another aspect of the technology described herein, a method of making a workpiece includes: depositing a material in a build chamber; directing a build beam from a directed energy source to selectively fuse the material in a pattern corresponding to a cross-sectional layer of the workpiece, wherein a melt pool is formed by the directed energy source; using an imaging apparatus to generate an image of the melt pool comprising an array of individual image elements, the image including a measurement of at least one physical property for each of the individual image elements; from the measurements, mapping a melt pool boundary of the melt pool; computing a geometric length of the melt pool boundary; and controlling at least one aspect of making the workpiece with reference to the geometric length.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
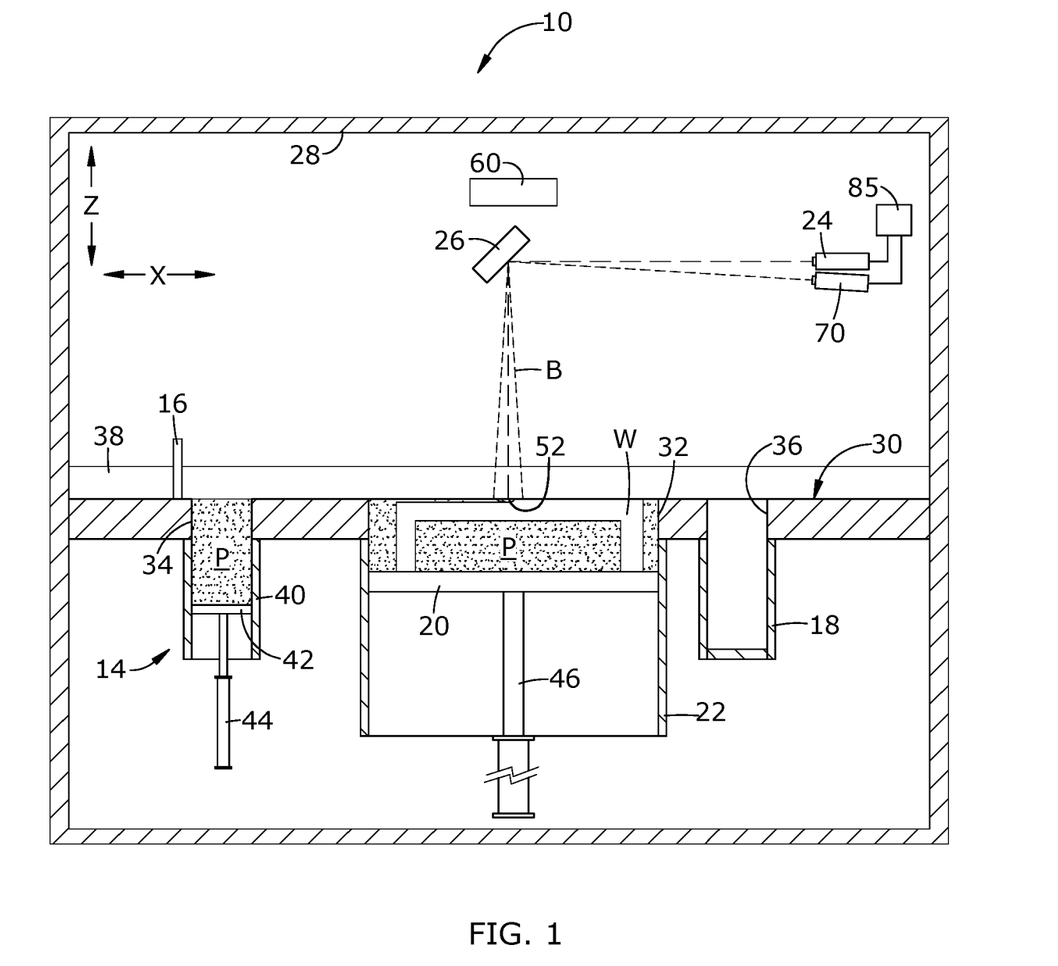
FIG. 1 is a schematic, partially-sectioned front elevation view of an exemplary additive manufacturing machine.

Referring to the drawings wherein identical reference numerals denote the same elements throughout the various views, FIG. 1 illustrates schematically an additive manufacturing machine 10 suitable for carrying out an additive manufacturing method. The machine 10 and its operation are as representative example of a "powder bed machine".

It will be understood that the machine 10 is merely used as an example to provide context for describing the principles of the present invention. The principles described herein are applicable to other configurations of powder bed machines, as well as to other types of additive manufacturing machines and related processes. More generally, the principles described herein would be applicable to any manufacturing process in which a melt pool is generated. Nonlimiting examples of such processes include electron-beam melting ("EBM"), directed energy deposition ("DED"), and laser welding. The term "manufacturing process" could also encompass repair processes where components are built up or joined together using a technique that generates a melt pool.

Basic components of the machine 10 include a table 12, a powder supply 14, a recoater 16, an overflow container 18, a build platform 20 surrounded by a build chamber 22, a directed energy source 24, and a beam steering apparatus 26, all surrounded by a housing 28. Each of these components will be described in more detail below.

The table 12 is a rigid structure defining a planar worksurface 30. The worksurface 30 is coplanar with and defines a virtual workplane. In the illustrated example it includes a build opening 32 communicating with the build chamber 22 and exposing the build platform 20, a supply opening 34 communicating with the powder supply 14, and an overflow opening 36 communicating with the overflow container 18.

The recoater 16 is a rigid, laterally-elongated structure that lies on the worksurface 30. It is connected to an actuator 38 operable to selectively move the recoater 16 along the worksurface 30. The actuator 38 is depicted schematically in FIG. 1, with the understanding devices such as pneumatic or hydraulic cylinders, ballscrew or linear electric actuators, and so forth, may be used for this purpose.

The powder supply 14 comprises a supply container 40 underlying and communicating with the supply opening 34, and an elevator 42. The elevator 42 is a plate-like structure that is vertically slidable within the supply container 40. It is connected to an actuator 44 operable to selectively move the elevator 42 up or down. The actuator 44 is depicted schematically in FIG. 1, with the understanding that devices such as pneumatic or hydraulic cylinders, ballscrew or linear electric actuators, and so forth, may be used for this purpose. When the elevator 42 is lowered, a supply of powder "P" of a desired composition (for example, metallic, ceramic, and/ or organic powder) may be loaded into the supply container 40. When the elevator 42 is raised, it exposes the powder P above the worksurface 30. Other types of powder supplies may be used; for example, powder may be dropped into the build chamber 22 by an overhead device (not shown).

The build platform 20 is a plate-like structure that is vertically slidable below the build opening 32. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose. When the build platform 20 is lowered into the build chamber 22 during a build process, the build chamber 22 and the build platform 20 collectively surround and support a mass of powder P along with any components being built. This mass of powder is generally referred to as a "powder bed", and this specific category of additive manufacturing process may be referred to as a "powder bed process".

The overflow container 18 underlies and communicates with the overflow opening 36, and serves as a repository for excess powder P.

The directed energy source 24 may comprise any device operable to generate a beam of suitable power and other operating characteristics to melt and fuse the powder P during the build process, described in more detail below. For example, the directed energy source 24 may be a laser. Other directed-energy sources such as electron beam guns are suitable alternatives to a laser.

The beam steering apparatus 26 may include one or more mirrors, prisms, and/or lenses and provided with suitable actuators, and arranged so that a beam "B" from the directed energy source 24 can be focused to a desired spot size and steered to a desired position in plane coincident with the worksurface 30. For purposes of convenient description, this plane may be referred to as a X-Y plane, and a direction perpendicular to the X-Y plane is denoted as a Z-direction (X, Y, and Z being three mutually perpendicular directions). The beam B may be referred to herein as a "build beam".

The housing 28 serves to isolate and protect the other components of the machine 10. During the build process described above, the housing 28 is provided with a flow of an appropriate shielding gas which, among other functions, excludes oxygen from the build environment. To provide this flow the machine 10 may be coupled to a gas flow apparatus 54, seen in FIG. 2. The exemplary gas flow apparatus 54 includes, in serial fluid flow communication, a variable-speed fan 56, a filter 58, an inlet duct 60 communicating with the housing 28, and a return duct 64 communicating with the housing 28. All of the components of the gas flow apparatus 54 are interconnected with suitable ducting and define a gas flow circuit in combination with the housing 28.

Figure 2:
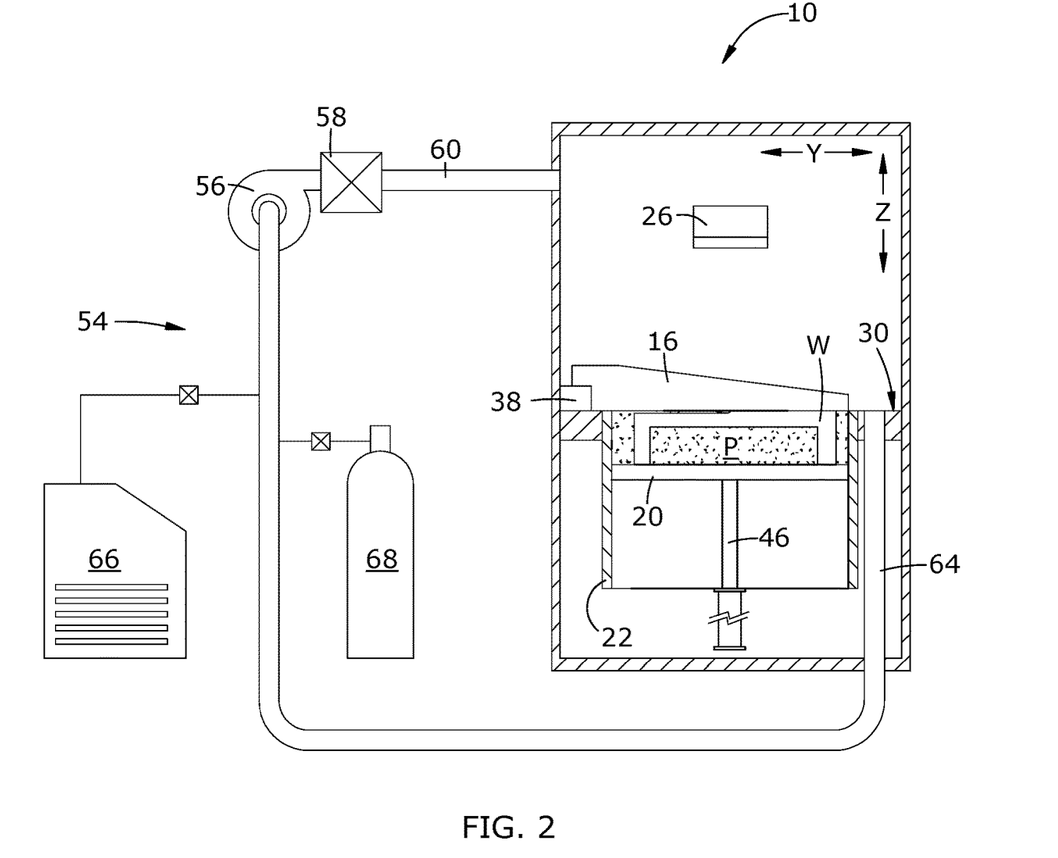
FIG. 2 is a schematic, partially-sectioned side elevation view of the machine of FIG. 1.

The composition of the gas used may similar to that used as shielding gas for conventional welding operations. For example, gases such as nitrogen, argon, or mixtures thereof may be used. Any convenient source of gas may be used. For example, if the gas is nitrogen, a conventional nitrogen generator 66 may be connected to the gas flow apparatus 54. Alternatively, the gas could be supplied using one or more pressurized cylinders 68.

An exemplary basic build process for a workpiece W using the apparatus described above is as follows. The build platform 20 is moved to an initial high position. The build platform 20 is lowered below the worksurface 30 by a selected layer increment. The layer increment affects the speed of the additive manufacturing process and the resolution of the workpiece W. As an example, the layer increment may be about 10 to 100 micrometers (0.0004 to 0.004 in.). Powder "P" is then deposited over the build platform 20 for example, the elevator 42 of the supply container 40 may be raised to push powder through the supply opening 34, exposing it above the worksurface 30. The recoater 16 is moved across the worksurface to spread the raised powder P horizontally over the build platform 20. Any excess powder P drops through the overflow opening 36 into the overflow container 18 as the recoater 16 passes from left to right. Subsequently, the recoater 16 may be moved back to a starting position. The leveled powder P may be referred to as a "build layer" and the exposed upper surface thereof may be referred to as a "build surface".

The directed energy source 24 is used to melt a two-dimensional cross-section or layer of the workpiece W being built. The directed energy source 24 emits a beam "B" and the beam steering apparatus 26 is used to steer a focal spot of the build beam B over the exposed powder surface in an appropriate pattern. A small portion of exposed layer of the powder P surrounding the focal spot, referred to herein as a "melt pool" 52 is heated by the build beam B to a temperature allowing it to sinter or melt, flow, and consolidate. As an example, the melt pool 52 may be on the order of 100 micrometers (0.004 in.) wide. This step may be referred to as fusing the powder P.

The build platform 20 is moved vertically downward by the layer increment, and another layer of powder P is applied in a similar thickness. The directed energy source 24 again emits a build beam B and the beam steering apparatus 26 is used to steer the focal spot of the build beam B over the exposed powder surface in an appropriate pattern. The exposed layer of the powder P is heated by the build beam B to a temperature allowing it to sinter or melt, flow, and consolidate both within the top layer and with the lower, previously-solidified layer.

This cycle of moving the build platform 20, applying powder P, and then directed energy fusing the powder P is repeated until the entire workpiece W is complete.

Figure 3:
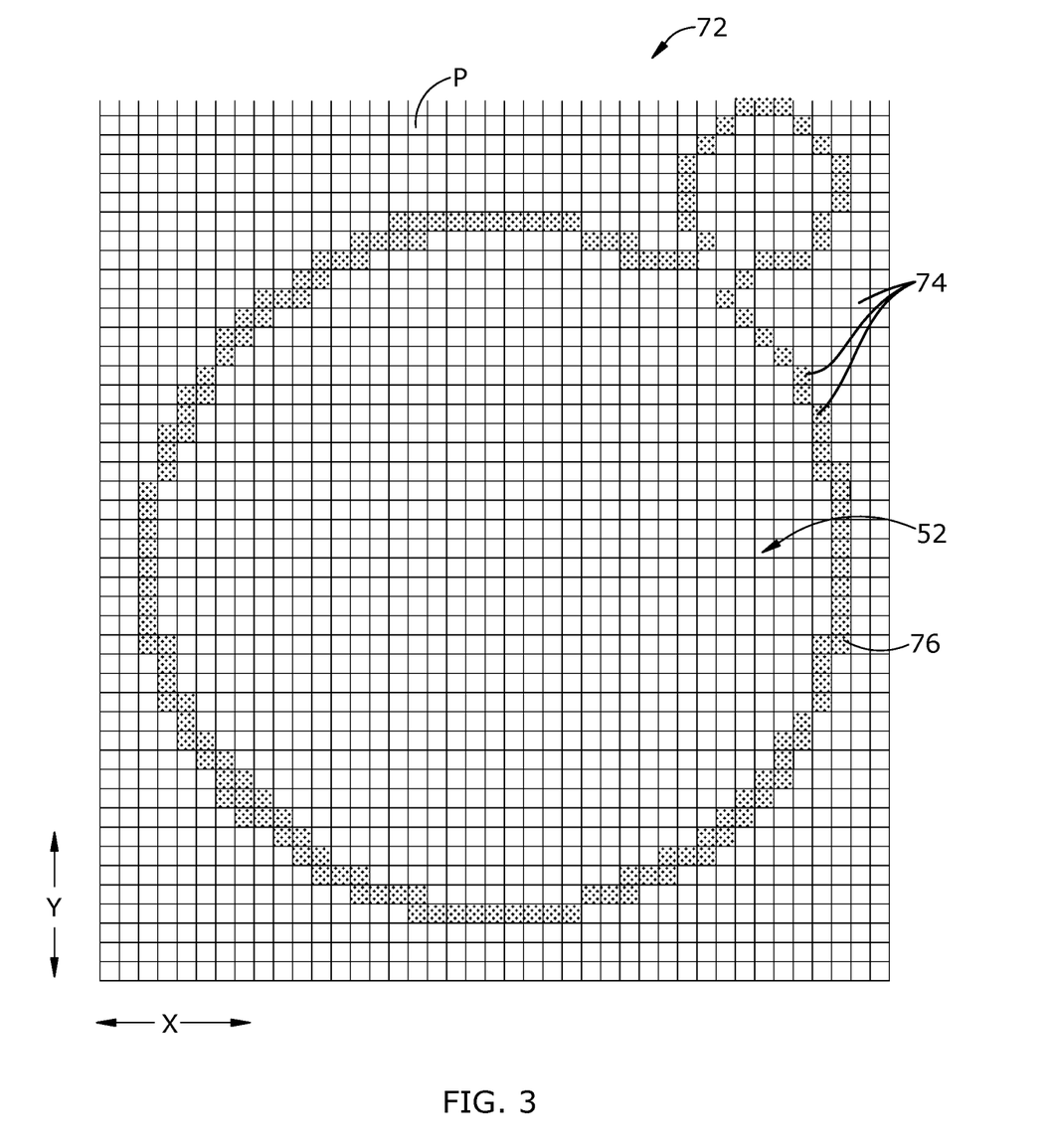
FIG. 3 is a schematic top plan view of an image of a powder bed including a melt pool.

The additive manufacturing machine 10 is provided with an imaging apparatus 70 which is operable to produce a digital image of the melt pool 52 comprising an array of individual image elements, i.e., pixels for a 2-D array or voxels for a 3-D array. An example of such an image 72 is shown in FIG. 3, with image elements 74. The imaging apparatus 70 is operable to produce, for each image element, a measurement of at least one physical property. The measurement may include at least one scalar value such as brightness, intensity, frequency, temperature, or Z-height. Alternatively, the imaging apparatus 70 may produce a signal representative of multiple factors, for example RGB color values. The imaging apparatus 70 is also operable to produce relative or absolute positional information for each imaging element. For example, the output of the imaging apparatus 70 for a particular image element 74 may be in the format X, Y, T where X equals X-position, Y equals Y-position, and T equals temperature.

Nonlimiting examples of suitable imaging apparatus 70 include photodiode arrays, photomultiplier tube ("PMT") arrays, digital cameras (e.g. CMOS or CCD), or optical coherence tomography ("OCT") apparatus. Optical coherence tomography ("OCT") is a known technique which is capable of providing Z-axis information as well as X and Y information (e.g., "3-D information"). In the illustrated example, the imaging apparatus 70 is depicted as a digital camera placed so that its field-of-view encompasses the melt pool 52. This particular example shows an "on-axis" device which shares the same optical path as the build beam B.

Alternatively, the imaging apparatus 70 could be mounted "off-axis", i.e., outside the optical axis of the build beam B. The imaging apparatus 70 may be statically mounted or it may be mounted so that it can be driven by one or more actuators (not shown) in order to track the position of the melt pool 52.

The imaging apparatus 70 may be configured to acquire a series of static images at regular intervals, or it may operate continuously.

The melt pool images 72 create a base dataset on which analysis may be performed. The next step is to determine a boundary of the melt pool 52 based on the image 72 produced by the imaging apparatus 70.

The process of determining a boundary of the melt pool 52 may be carried out using appropriately-programmed software running on one or more processors embodied in a device such as a microcomputer (not shown). Such software may be implemented on a device separate from the machine 10, or it may be incorporated into the machine 10, for example the software may be run by the controller described below.

Continuing to refer to FIG. 3, a portion of the powder bed P is shown with a melt pool 52 superimposed thereon. The melt pool 52 is shown having a peripheral melt pool boundary 76 or closed perimeter, identified by the shaded image elements 74, which is a demarcation between the interior of the melt pool 52 and the exterior of the melt pool 52.

Figure 4:
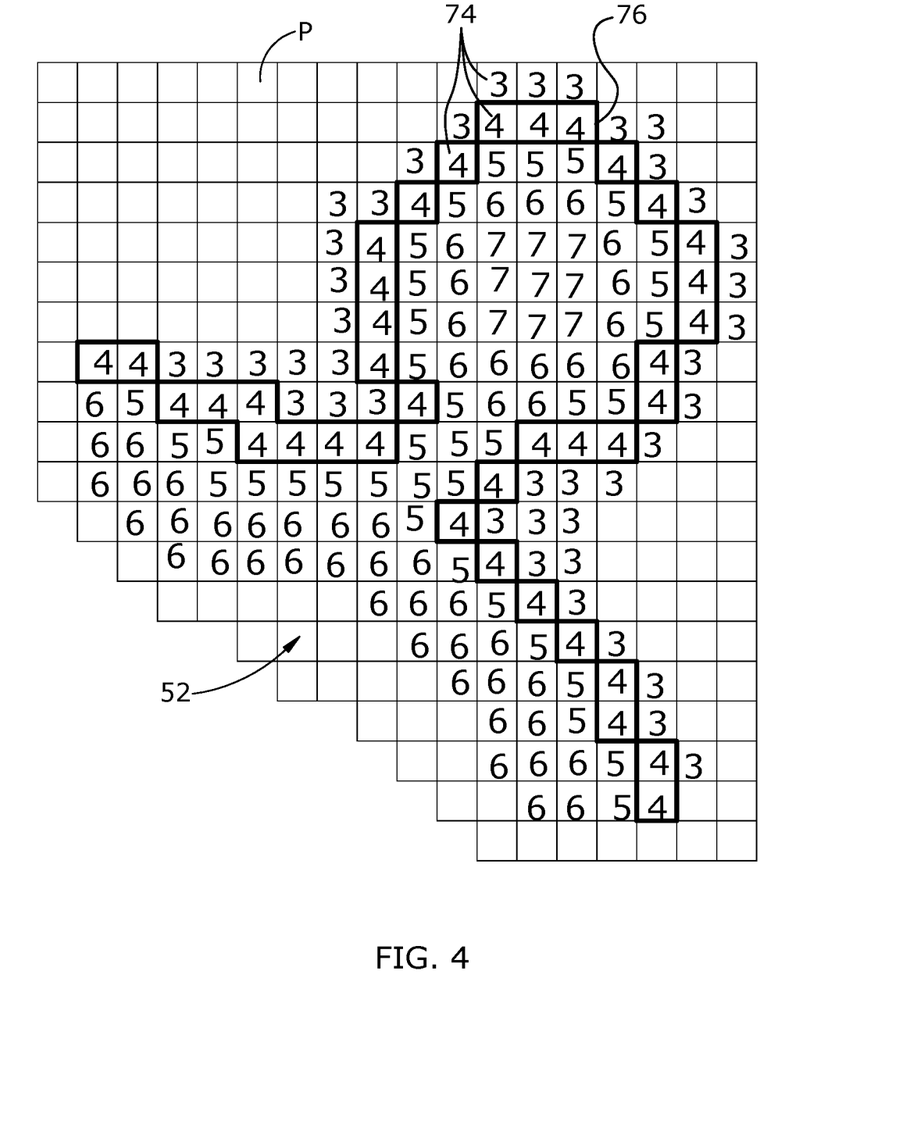
FIG. 4 is an enlarged view of a portion of a melt pool image.

Various criteria may be used for determining the location of the melt pool boundary 76. In one example, a threshold value may be established, and the melt pool boundary 76 may include any image elements which are equal to the threshold value. For example, FIG. 4 shows a simplified representation of a portion of the melt pool 52 in which each image element 74 is assigned a scalar value corresponding to sensed data. For example, temperature data might be represented on a 0-10 scale. In this example, the threshold value is "4" (this is an arbitrary value used as an example). Accordingly, each image element 74 returning the value 4 is declared or defined to constitute a portion of the melt pool boundary 76. Any image element 74 returning a value greater than 4 is declared or defined to be inside the melt pool 52, and any image element 74 returning a value less than 4 is declared or defined to be outside the melt pool 52.

The threshold value may include a range or band of values, for the purpose of resolving ambiguity. For example, in the above-described situation where temperature is represented on a 0-10 scale, the threshold value representing inclusion in the melt pool boundary 76 might be any value greater than 3.0 and less than 5.0.

In practice, the range of sensor values and the threshold value or threshold range may be stored in a calibration table which is then referenced by the software to evaluate the melt pool 52 during machine operation. The values for the calibration table may be determined analytically or empirically.

The criteria for determining the location of the melt pool boundary 76 may be based on a simple scalar value in a 2-D image as described in the above example, for example temperature, image element intensity, etc.

Alternatively, another 2-D property or combination of properties such as image element color, emission frequency, or image element sheen may be used as a criteria for determining the location of the melt pool boundary 76. Such properties are combination of properties may be more directly indicative of the presence of a difference in phase (liquid versus solid), or of melting or incipient melting as an example, a certain material with a given melting point can be characterized by the sensing system to calibrate the appropriate values to consider melted versus un-melted material. The boundary is then tied to correlated material properties, namely the liquid versus solid phases.

Alternatively, a 3-D property or combination of properties may be used as a criteria for determining location of the melt pool boundary 76. For example, a height increase or decrease relative to the surrounding material may be indicative of the presence of the difference in phase (liquid versus solid), or of melting or incipient melting. A further example would use the presence of the meniscus in the 3-D data by means of a topographic transition in the data to segregate the data into melted and unmelted regions.

The output of the boundary determination process described above is a digital map of the melt pool boundary 76. The process of determining the location of the melt pool boundary 76 may be referred to as "mapping the melt pool boundary".

Once the melt pool boundary 76 is established, one or more geometric analytical constructs may be used to analyze the boundary and determine the quality of the melt pool 52.

One analytical construct for evaluating the melt pool boundary 76 is to consider its geometric length. Geometric length may also be referred to as arc length; the two terms are used interchangeably herein.

Numerous techniques are available for computing geometric length of the melt pool boundary 76. For the purposes of the present invention, any known method of computing the geometric length for a given melt pool boundary 76 would be acceptable.

Figure 5:
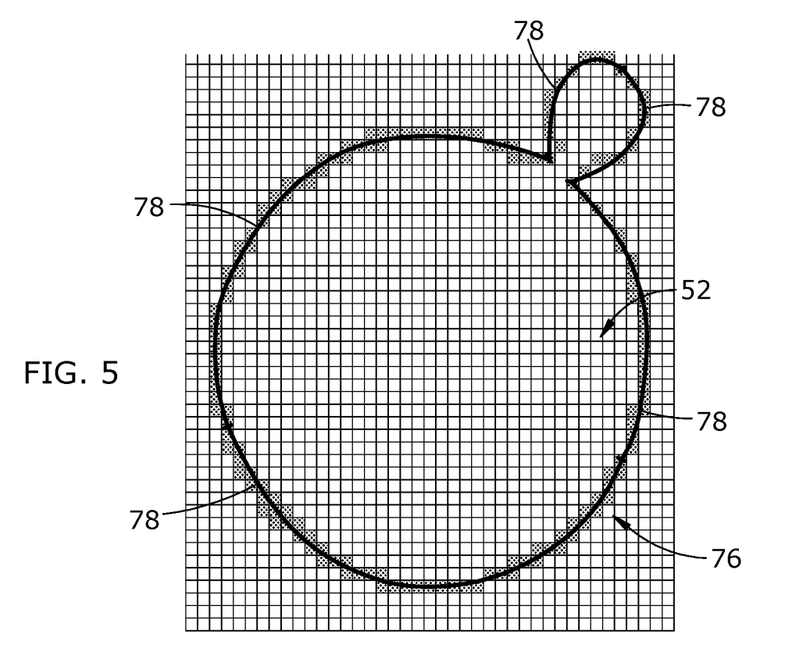
FIG. 5 is a view of the melt pool image shown in FIG. 3, having a series of curves overlaid on a melt pool boundary.
Figure 6:
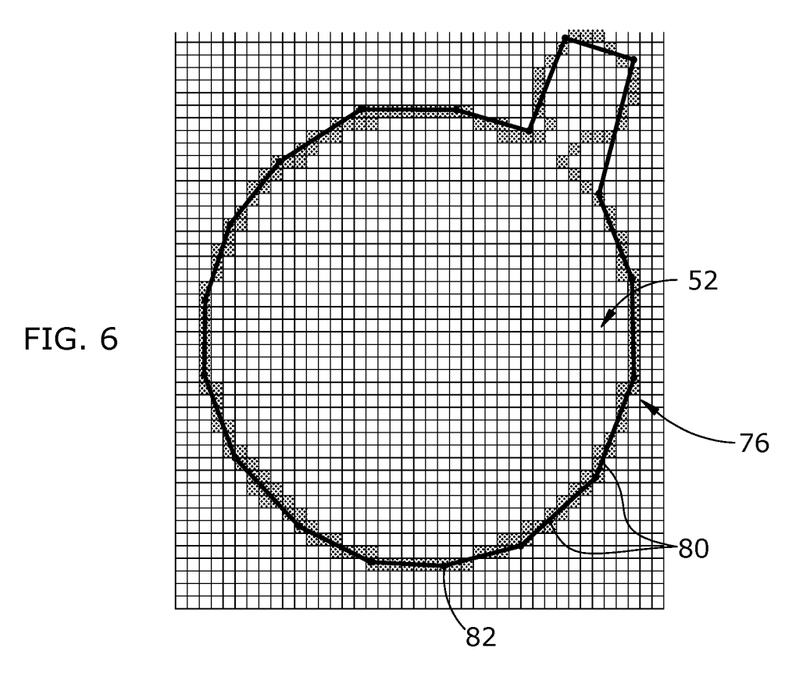
FIG. 6 is a view of the melt pool image shown in FIG. 3, having a series of line segments overlaid on a melt pool boundary.

For example, because the melt pool image 72 is digitized, one simple method involves counting the image elements 74 that define the melt pool boundary 76. Another exemplary method would involve breaking down the melt pool boundary 76 into a plurality of curves that can be defined as a function $y=f(x)$ in a Cartesian space. An example is shown in FIG. 5, with the individual curves labeled 78. The arc length of the individual curves 78 can then be integrated using analytical or numerical methods, and the individual arc lengths can be summed. Yet another exemplary method would involve breaking down the melt pool boundary 76 into a plurality of straight line segments and summing the lengths of the line segments. FIG. 6 shows an example of a plurality of line segments 80 intersecting at vertices 82, which are shown by enlarged circles for ease of visibility.

The geometric length, once computed, provides a parameter that can be used to evaluate the melt pool boundary 76.

As an alternative to using only the geometric length, a ratio of the melt pool intensity to the geometric length may be used as a figure of merit.

In one technique, a limit value may be established for the geometric length or the ratio described above as a basis for concluding that the melt pool 52 is acceptable or not, corresponding to the additive manufacturing process being "unfaulted" or "faulted".

Figure 7:
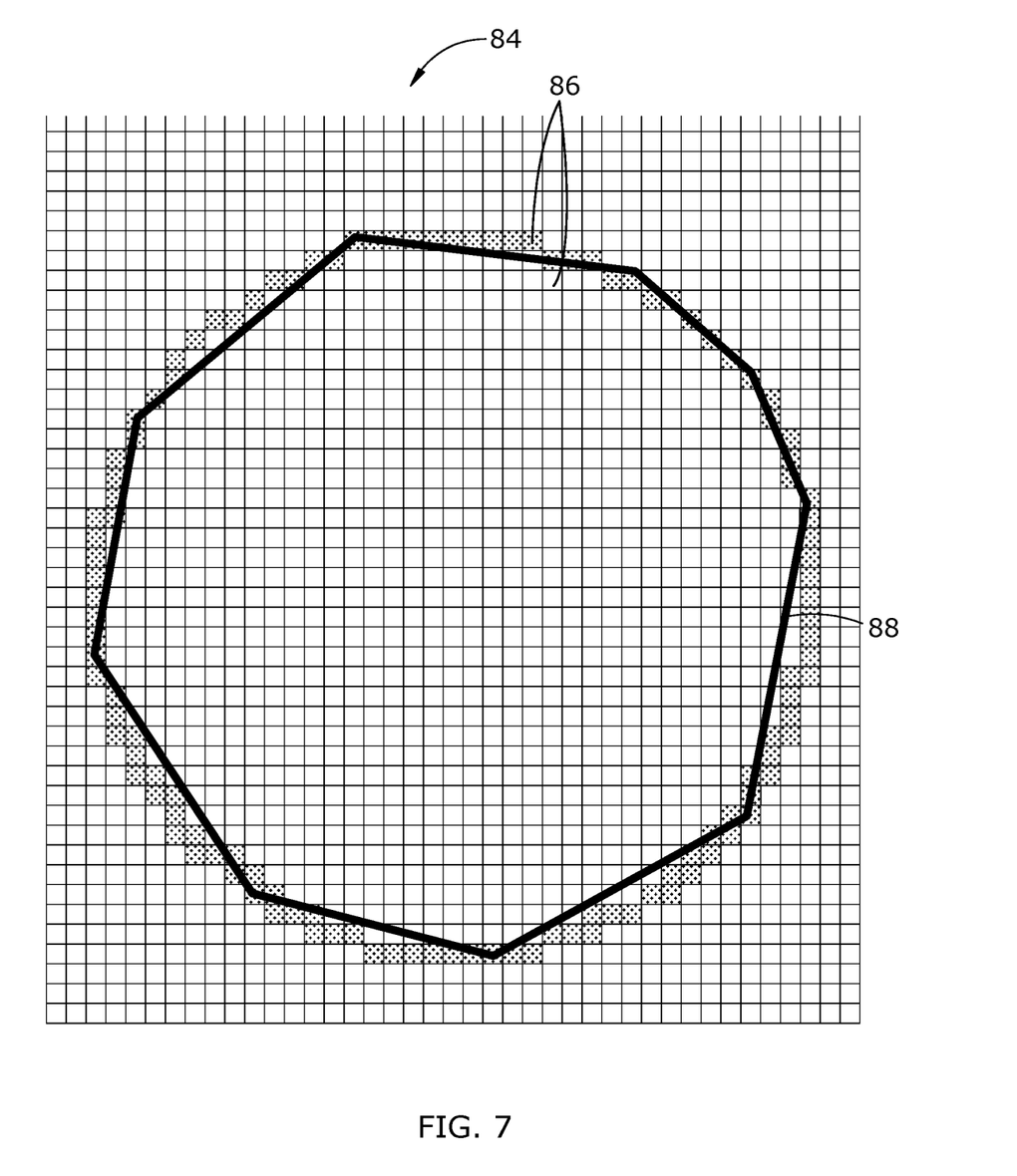
FIG. 7 is a schematic view of a melt pool template.

For example, FIG. 7 depicts a model of an idealized melt pool template 84. The melt pool template 84 is made up of image elements 86 and includes a predetermined template boundary 88 which is representative of a known good process (i.e., unfaulted). While no specific shape is necessarily required for an acceptable process, it is generally true that the more complex shape of FIG. 3, having a higher geometric length, is more likely to be unacceptable and indicative of a process problem, than a less complex shape.

In one example, software may be used to compute the geometric length based on the measured data. If the geometric length exceeds the limit value, the melt pool boundary 76 of the melt pool 52 may be declared to be unacceptable (i.e., process faulted).

The melt pool quality determination may be repeated for each individual melt pool image 72 as they are acquired.

Other methods may be used beyond a simple comparison of the geometric length to a threshold value. In one example, the computed geometric length for each melt pool image 72 may be used as an input into a single or multivariate statistical process control ("SPC") process. Nonlimiting examples of known SPC methods include principal component analysis ("PCA"), independent component analysis ("ICA"), and kernel PCA. For example, the computed geometric length would be in input into one of the above-noted SPC methods along with other process parameters or extracted values from the process (such as melt pool intensity, melt pool area, etc.). The PCA could then be performed and process control could be implemented based on the reduced variables. Another example would be to use the computed geometric length in multivariate SPC methodologies such as partial least squares ("PLS"). In PLS, one could use geometric length as an input for doing process control on another variable. An example would be that geometric length, along with other possible independent variables (inputs or "Xs") would be used in PLS for predicting other dependent variable (outputs or "Ys"), such as melt pool intensity. Alternately, geometric length could be used as a dependent variable in PLS and then the methodology could be used to predict the geometric length, which would serve as a basis for process control.

The process may include creating populations of unfaulted and faulted process states based on the geometric length. Specifically, each melt pool image 72 would be assigned to either the unfaulted or faulted population as its geometric length is computed.

Various manual or automated methods may be used to assign the populations. In one example, the geometric length of current process could be assigned to the populations of unfaulted and faulted process through a Multiple Model Hypothesis Test framework.

A melt pool monitoring process may be incorporated into the build process described above. Generally stated, the monitoring process includes using the imaging apparatus 70 described above to acquire melt pool images 72, evaluating the melt pool 52 using one or more of the geometric length techniques described above, and then adjusting one or more process parameters as necessary. As used herein, "process parameters" can refer to any controllable aspect of the machine 10.

The monitoring process may include taking a discrete action in response to the geometric length evaluation indicating a process fault, such as providing a visual or audible alarm to a local or remote operator.

The monitoring process may include stopping the build process in response to geometric length evaluation indicating a process fault. This is another example of a discrete action.

The monitoring process may include real-time control of one or more process parameters, such as directed energy source power level or beam scan velocity, using a method such as: statistical process control, feedforward control, feedback control using proportional, proportional-integral, or proportional-integral-derivative control logic, neural network control algorithms, or fuzzy logic control algorithms.

The monitoring method may include monitoring of the condition or "health" of the machine 10. Melt pool measurements may be measured and stored during several build cycles and compared between cycles. For example, a change in melt pool consistency between cycles could indicate machine miscalibration or degradation. Corrective action could take the form of machine maintenance or repairs, or modification of process parameters in subsequent builds to compensate for machine degradation.

The operation of the apparatus described above including the machine 10 and imaging apparatus 70 may be controlled, for example, by software running on one or more processors embodied in one or more devices such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control. FIG. 1 illustrates schematically a controller 85 which includes one or more processors operable to control the machine 10.

The method described herein has several advantages over the prior art. In particular, direct analysis of the melt pool is a key indicator of the stability of the manufacturing process and ultimately of the conformity of workpieces to geometric, metallurgical and mechanical requirements.

Establishing melt pool stability using the method described herein can also reduce machine setup costs through validation of the process to a known good standard, reduce existing material development for additive, reduce application development and be an enabler for novel alloy for additive development.

The foregoing has described an apparatus and method for melt pool monitoring in a manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of controlling an additive manufacturing process in which a directed energy source is used to selectively melt material to form a workpiece, forming a melt pool in the process of melting, the method comprising:
   using an imaging apparatus to generate an image of the melt pool comprising an array of individual image elements, the image including a measurement of at least one physical property for each of the individual image elements;
   from the measurements, mapping a melt pool boundary of the melt pool;
   computing a geometric length of the melt pool boundary; and
   controlling at least one aspect of the additive manufacturing process with reference to the geometric length, wherein:
   the geometric length is used to create populations of unfaulted and faulted process states, wherein the geometric length of current process is assigned to the populations of unfaulted and faulted process through a multiple model hypothesis test framework.

2. The method of claim 1, wherein the measurement for each of the image elements includes at least one scalar value.

3. The method of claim 1, wherein the step of computing the geometric length of the melt pool boundary includes:
   representing the melt pool boundary by a plurality of line segments;
   computing a length of each of the plurality of line segments; and
   summing the lengths of the line segments.

4. The method of claim 1 wherein the step of mapping the boundary of the melt pool includes:
   establishing a threshold value;
   comparing the measurement for each of the image elements to the threshold value; and
   defining each of the image elements which matches the threshold value to constitute a portion of the melt pool boundary.

5. The method of claim 4, wherein the threshold value is a range having predetermined upper and lower boundaries.

6. The method of claim 1, further comprising evaluating the geometric length for indications of a process fault.

7. The method of claim 6, wherein the geometric length exceeding a predetermined limit value indicates a process fault.

8. The method of claim 6 wherein the step of controlling includes taking a discrete action in response to the geometric length indicating a process fault.

9. The method of claim 8 wherein the discrete action is stopping the additive manufacturing process.

10. The method of claim 8 wherein the discrete action is providing a visual or audible alarm to a local or remote operator.

11. The method of claim 1 wherein the step of controlling includes changing at least one process parameter of the additive manufacturing process.

12. The method of claim 11 wherein the controlled process parameter includes at least one of: directed energy source power level and beam scan velocity.

13. The method of claim 1, further comprising:
   computing a ratio of the geometric length to measured melt pool intensity; and
   controlling the additive manufacturing process with reference to the computed ratio.

14. A method of making a workpiece, comprising:
   depositing a material in a build chamber;
   directing a build beam from a directed energy source to selectively fuse the material in a pattern corresponding to a cross-sectional layer of the workpiece, wherein a melt pool is formed by the directed energy source;
   using an imaging apparatus to generate an image of the melt pool comprising an array of individual image elements, the image including a measurement of at least one physical property for each of the individual image elements;
   from the measurements, mapping a melt pool boundary of the melt pool;
   computing a geometric length of the melt pool boundary; and
   controlling at least one aspect of making the workpiece with reference to the geometric length, wherein:
   the geometric length is used to create populations of unfaulted and faulted process states, wherein the geometric length of the current process is assigned to the populations of unfaulted and faulted process through a multiple model hypothesis test framework.

15. The method of claim 14, further comprising evaluating the geometric length for indications of a process fault.

* * * * *